United States Patent
Kanumuri et al.

(10) Patent No.: US 9,723,200 B2
(45) Date of Patent: Aug. 1, 2017

(54) CAMERA CAPTURE RECOMMENDATION FOR APPLICATIONS

(71) Applicant: Microsoft Corporation, Redmond, WA (US)

(72) Inventors: Sandeep Kanumuri, Redmond, WA (US); Naveen Thumpudi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 213 days.

(21) Appl. No.: 14/515,461

(22) Filed: Oct. 15, 2014

(65) Prior Publication Data

US 2016/0112630 A1    Apr. 21, 2016

(51) Int. Cl.
*H04N 5/235*    (2006.01)
*H04N 5/232*    (2006.01)
*H04N 5/262*    (2006.01)

(52) U.S. Cl.
CPC ....... *H04N 5/23222* (2013.01); *H04N 5/2355* (2013.01); *H04N 5/2356* (2013.01); *H04N 5/23225* (2013.01); *H04N 5/23229* (2013.01); *H04N 5/2625* (2013.01)

(58) Field of Classification Search
CPC ............. G11B 27/036; H04N 5/23222; H04N 5/23229; H04N 5/2355; H04N 5/2625; H04N 5/23212; H04N 5/23225; H04N 5/23293; H04N 5/2356
See application file for complete search history.

(56) References Cited

U.S. PATENT DOCUMENTS

| | | | |
|---|---|---|---|
| 5,479,237 A | 12/1995 | Kitaoka | |
| 6,301,440 B1 | 10/2001 | Bolle et al. | |
| 7,668,454 B2 | 2/2010 | Battles et al. | |
| 8,094,963 B2 | 1/2012 | Funayama | |

(Continued)

FOREIGN PATENT DOCUMENTS

| | | |
|---|---|---|
| WO | 2012170111 A1 | 12/2012 |
| WO | 2014064690 A1 | 5/2014 |

OTHER PUBLICATIONS

"HDR Photo Camera", Retrieved on: Aug. 4, 2014, pp. 3 Available at: http://www.windowsphone.com/en-in/store/app/hdr-photo-camera/45404f0e-7240-435c-9592-c72facc8a277.

"iOS 8 Preview", Published on: Jun. 3, 2013, pp. 6 Available at: https://www.apple.com/ios/ios8/photos/.

"International Search Report and Written Opinion Issued in PCT Application No. PCT/US2015/055188" (foreign counterpart application to U.S Appl. No. 14/515,461), Mailed Date: Apr. 19, 2016, 19 Pages.

(Continued)

*Primary Examiner* — Trung Diep

(57) ABSTRACT

One or more techniques and/or systems are provided for camera capture recommendation. For example, an application may operate to capture an image using a capture device (e.g., a user may use a camera of a smart phone to capture a vacation photo for sharing through a social network app). Camera parameters of the capture device and/or a preview data stream (e.g., pixel data depicting a beach "seen" by the camera in real-time) may be used to generate a camera capture recommendation (e.g., a recommendation to use a haze removal module, a high dynamic range module, a focus bracketing module, etc.). The camera capture recommendation is provided to the application. In this way, the application may selectively use, override, supplement (e.g., use an application supplied module), or modify the camera capture recommendation for application to the capture device to obtain an output image.

20 Claims, 8 Drawing Sheets

(56) References Cited

U.S. PATENT DOCUMENTS

| | | |
|---|---|---|
| 8,212,911 B2 | 7/2012 | Nonaka |
| 8,780,232 B2 | 7/2014 | Craig et al. |
| 2003/0169350 A1 | 9/2003 | Wiezel et al. |
| 2010/0123805 A1 | 5/2010 | Craig et al. |
| 2011/0187914 A1* | 8/2011 | Lee .................. H04N 5/222 348/333.11 |
| 2012/0062691 A1 | 3/2012 | Fowler et al. |
| 2012/0229654 A1 | 9/2012 | Solomon |
| 2013/0176458 A1 | 7/2013 | Van Dalen et al. |
| 2014/0019264 A1* | 1/2014 | Wachman ........ G06Q 30/0276 705/14.72 |
| 2014/0028885 A1* | 1/2014 | Ma .................. H04N 5/23216 348/333.01 |
| 2014/0089401 A1 | 3/2014 | Filev et al. |
| 2015/0033129 A1* | 1/2015 | Cho ................. G06F 3/0488 715/728 |

OTHER PUBLICATIONS

PCT Application No. PCT/US2015/055188 (foreign counterpart application to U.S. Appl. No. 14/515,461), Written Opinion of the International Preliminary Examining Authority (PCT Rule 66), dated Jul. 19, 2016, 10 pages.

PCT Application No. PCT/US2015/055188 (foreign counterpart application to U.S. Appl. No. 14/515,461), Article 34 Demand, correspondence and amended claims, dated Jun. 10, 2016, 19 pages.

PCT Application No. PCT/US2015/055188 (foreign counterpart application to U.S. Appl. No. 14/515,461), Response to Written Opinion of the International Preliminary Examining Authority (PCT Rule 66), dated Sep. 19, 2016, 9 pages.

"International Preliminary Report on Patentability Issued in PCT Application No. PCT/US2015/055188", Mailed Date: Nov. 25, 2016, 12 Pages.

* cited by examiner

CAMERA CAPTURE RECOMMENDATION FOR APPLICATIONS

BACKGROUND

Many users may capture imagery, such as photos, using various types of devices. In an example, a user may capture a vacation photo using a digital camera. In another example, the user may capture a sporting event photo using a camera of a mobile phone. In another example, the user may capture a newly renovated kitchen using a camera of a tablet. A device may provide the user with varying levels of control over how photos are captured (e.g., a black and white setting, a zoom setting, a resolution setting, a flash setting, etc.).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for camera capture recommendation and/or for image fusion are provided herein. In an example of camera capture recommendation, a capture recommendation module is configured to obtain at least one of camera parameters of a capture device that is to capture an image for use by an application or a preview data stream from the capture device. The preview data stream depicts a scene for capture by the capture device. The capture recommendation module is configured to evaluate at least one of the camera parameters or the preview data stream to generate a camera capture recommendation. The capture recommendation module is configured to provide the camera capture recommendation to the application.

In an example of image fusion, a fusion component is configured to obtain a set of bracketed images captured by a capture device based upon a recommendation implementation instruction specified by an application in response to a camera capture recommendation provided to the application. The fusion component is configured to perform image fusion on the set of bracketed images based upon the recommendation implementation instruction to create an output image. The fusion component is configured to provide the output image to the application.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
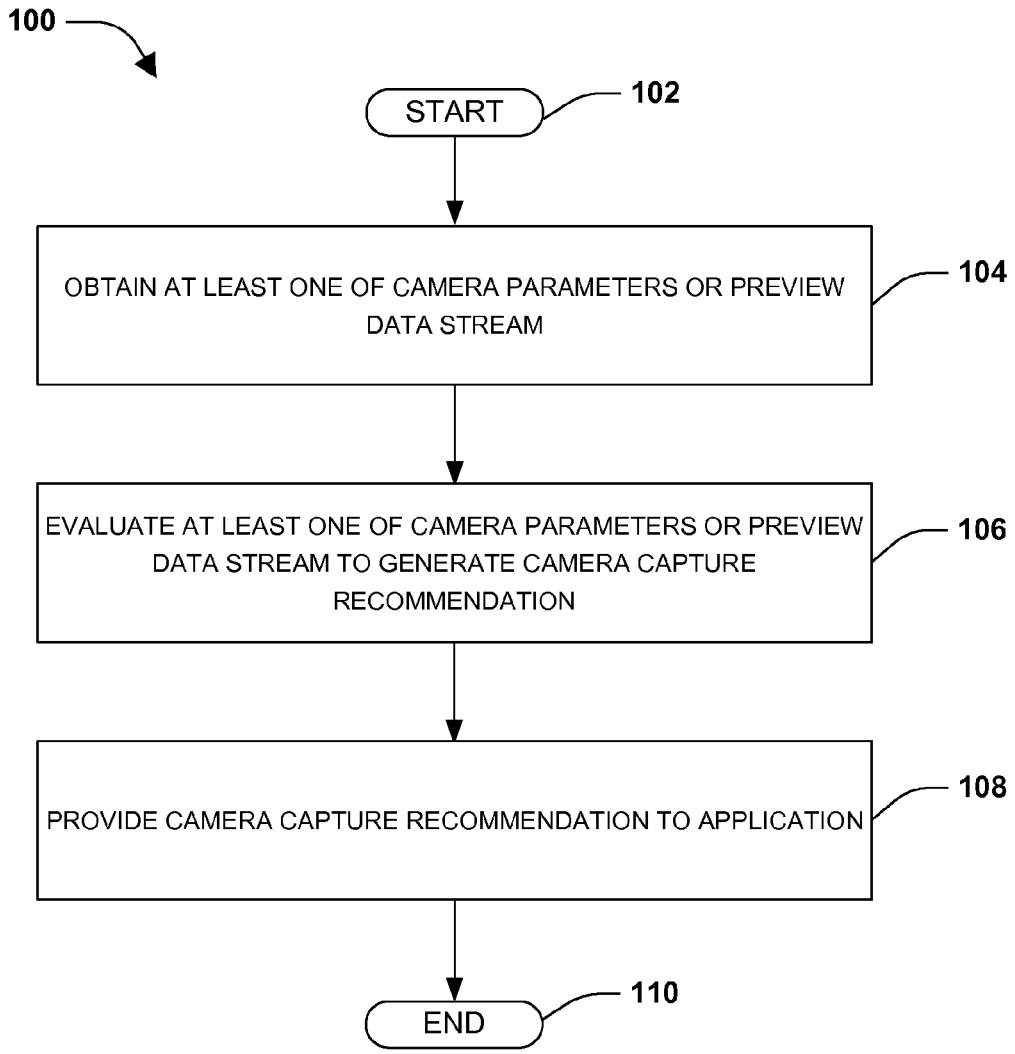
FIG. 1 is a flow diagram illustrating an exemplary method of camera capture recommendation.

The claimed subject matter is now described with reference to the drawings, wherein like reference numerals are generally used to refer to like elements throughout. In the following description, for purposes of explanation, numerous specific details are set forth to provide an understanding of the claimed subject matter. It may be evident, however, that the claimed subject matter may be practiced without these specific details. In other instances, structures and devices are illustrated in block diagram form in order to facilitate describing the claimed subject matter.

One or more systems and/or techniques for camera capture recommendation and/or image fusion are provided herein. An application developer may develop an application that may utilize imagery captured by a capture device of a computing device, such as a camera of a smartphone. The application developer may desire to provide the application with robust image capture functionality and/or control over how images are captured and/or processed. However, camera modules of capture devices may provide applications with little to no control over how images are captured and processed. For example, a camera module may merely provide the application with a high dynamic range (HDR) image without providing the application with discretion over what capture settings to use or not use and/or what modules to use or not use (e.g., an HDR image processing module, a flash bracketing image processing module, a focus bracketing image processing module, and/or other image processing modules for processing bracketed images captured by a capture device). Accordingly, as provided herein, a capture recommendation module may generate a camera capture recommendation comprising a set of capture settings and/or a number of images to capture for image fusion (e.g., a recommendation to capture 3 images at various exposure levels for HDR image processing) based upon camera parameters of the capture device and/or a preview data stream depicting a scene for capture. The camera capture recommendation, comprising capture settings used to capture and/or process images, may be provided to the application for selective application to the capture device. In an example, the application may use all, some, or none of the capture settings. In an example, the application may change or add capture settings. In an example, the application may provide custom capture settings and/or custom modules (e.g., a custom fusion module and/or a custom image processing module) to use. Thus, the application may use recommended capture settings, custom capture settings, recommended platform supplied image processing modules and fusion modules, and/or custom image processing modules and fusion modules. In this way, applications may efficiently utilize processing resources, such as image processing resources of the computing device, to obtain images having a desired quality.

An embodiment of camera capture recommendation is illustrated by an exemplary method 100 of FIG. 1. At 102, the method starts. A computing device may host an application (e.g., a social network application that provides photo sharing functionality) that may utilize images captured from a capture device such as a camera. In an example, the application may create an instance of a capture recommendation module, and may listen to the capture recommendation module for camera capture recommendation events corresponding to camera capture recommendations. At 104, at least one of camera parameters of the capture device that is to capture an image for use by the application or a preview data stream may be obtained from the capture device. The camera parameters may comprise at least one of an exposure time, an exposure compensation, ISO settings, focus settings, a capture scene mode (e.g., auto, manual, portrait, macro, etc.), a flash setting (e.g., power), a zoom setting, a sensor frame rate, a white balance parameter, a histogram of a scene that is to be captured by the capture device, an estimated noise variance, an estimated depth of the scene, a sharpness map of the scene, feature points in the scene (e.g., SIFT), or any other camera parameters or combinations thereof. The preview data stream may comprise pixel data of the scene that is to be captured by the capture device (e.g., the user may be using the computing device to capture an image of an outdoor scene comprising a car, and thus the pixel data may correspond to a portion of the outdoor scene that is seen by the capture device). For example, the preview data stream may comprise pixel data that is used to populate a viewfinder interface of the computing device with a visual display of the scene.

At 106, at least one of the camera parameters or the preview data stream are evaluated to generate a camera capture recommendation. The camera capture recommendation may comprise a set of capture settings (e.g., an exposure setting, an exposure compensation setting, an ISO speed, an ISO analog gain, an ISO digital gain, a focus setting, a focus state, a scene mode, a flash setting, a flash power percent, a white balance setting, a white balance gain, a zoom factor, a sensor frame rate, etc.) to apply to the capture device for image capture and/or a number of images to capture for image fusion (e.g., a recommendation to capture 3 images, at 3 different exposure levels, to create a high dynamic range output image).

In an example, a programming class (e.g., a SceneAnalysisEffect Sample class) may be used for camera capture recommendation. Example code for the programming class may be as follows:

```
class SceneAnalysisEffectSample : IDisposable
{
    MediaCapture mediaCapture = new MediaCapture( );
    SceneAnalysisEffect sceneAnalysisEffect;
    public async Task SetupSceneAnalysisEffectAsync( )
    {
        // Create SceneAnalysisEffectDefinition
        SceneAnalysisEffectDefinition analyzerDefinition = new SceneAnalysisEffectDefinition( );
        // Add Scene Analysis Effect to Preview
        sceneAnalysisEffect = (SceneAnalysisEffect)await mediaCapture.AddVideoEffectAsync(analyzerDefinition, MediaStreamType.VideoPreview);
        // Handle SceneAnalyzed event
        sceneAnalysisEffect.SceneAnalyzed += analyzer_SceneAnalyzed;
        // Customize the effect
        sceneAnalysisEffect.DesiredAnalysisPeriod = TimeSpan.FromMilliseconds(200);
        // High Dynamic Range Analyzer
        sceneAnalysisEffect.HighDynamicRangeAnalyzer.Enabled = true;
        sceneAnalysisEffect.HighDynamicRangeAnalyzer.FrameControllersEnabled = true;
        // Low Light Analyzer
        sceneAnalysisEffect.LowLightAnalyzer.Enabled = true;
        sceneAnalysisEffect.LowLightAnalyzer.FrameControllersEnabled = true;
        // Flash Technique Analyzer
        sceneAnalysisEffect.FlashTechniqueAnalyzer.Enabled = true;
        sceneAnalysisEffect.FlashTechniqueAnalyzer.FrameControllersEnabled = true;
        // Haze Analyzer
        sceneAnalysisEffect.HazeAnalyzer.Enabled = true;
        await mediaCapture.StartPreviewAsync( );
    }
    public async Task CleanupSceneAnalysisEffectAsync( )
    {
        // Clear all effects in the pipeline
        await mediaCapture.ClearEffectsAsync(MediaStreamType.VideoPreview);
    }
    public void Dispose( )
    {
        sceneAnalysisEffect.Dispose( );
        mediaCapture.Dispose( );
    }
    void analyzer_SceneAnalyzed(SceneAnalysisEffect sender, SceneAnalyzedEventArgs args)
```

```
        {
                var varPhotoSeqController =
mediaCapture.VideoDeviceController.VariablePhotoSequenceController;
                if (args.ResultFrame.HighDynamicRange.Certainty > .5)
                {
                        varPhotoSeqController.DesiredFrameControllers.Clear( );
varPhotoSeqController.DesiredFrameControllers.Concat(args.ResultFrame.HighDynamic
Range.FrameControllers);
                        // Use varPhotoSeqController to take variable photo sequence and
apply HDR fusion
                }
                else if (args.ResultFrame.LowLight.Certainty > .5)
                {
                        varPhotoSeqController.DesiredFrameControllers.Clear( );
varPhotoSeqController.DesiredFrameControllers.Concat(args.ResultFrame.LowLight.
FrameControllers);
                        // Use varPhotoSeqController to take variable photo sequence and
apply low light fusion
                }
                else if (args.ResultFrame.FlashTechnique.Certainty > .5)
                {
                        varPhotoSeqController.DesiredFrameControllers.Clear( );
varPhotoSeqController.DesiredFrameControllers.Concat(args.ResultFrame.FlashTechnique.
FrameControllers);
                        // Use varPhotoSeqController to take variable photo sequence and
apply flash fusion
                }
                else if (args.ResultFrame.Haze.Certainty > .5)
                {
                        // Enable haze removal and capture photo
                }
                else
                {
                        // Capture normal photo
                }
                // CapturedFrameControlValues is extended to provide more capture
device settings.
                // http://msdn.microsoft.com/en-
us/library/windowsphone/develop/windows.media.capture.capturedframecontrolvalues.
aspx
                // These settings may be used by sophisticated camera applications
                // args.ResultFrame.FrameControlValues has the following properties:
                // - Exposure, ExposureCompensation
                // - IsoSpeed, IsoAnalogGain, IsoDigitalGain
                // - Focus, FocusState
                // - SceneMode
                // - Flashed, FlashPowerPercent
                // - WhiteBalance, WhiteBalanceGain
                // - ZoomFactor
                // - SensorFrameRate
                // Usage of IsoDigitalGain and IsoAnalogGain is shown as an example.
Other properties can be accessed in a similar way
                if (args.ResultFrame.FrameControlValues.IsoDigitalGain.HasValue &&
args.ResultFrame.FrameControlValues.IsoAnalogGain.HasValue)
                {
                        float totalIsoGain =
args.ResultFrame.FrameControlValues.IsoDigitalGain.Value *
args.ResultFrame.FrameControlValues.IsoAnalogGain.Value;
                        if (totalIsoGain > 2)
                        {
                            // Apply custom denoising to captured photo
                        }
                }
                // args.ResultFrame inherits from IMediaFrame
                // IMediaFrame exposes RelativeTime, SystemRelativeTime, Duration,
Type, IsReadOnly IsDiscontinuous, ExtendedProperties
        }
}
```

In an example, a set of modules, such as one or more analysis modules, may be used to provide a confidence for a particular analysis scenario and/or what capture settings to use for the analysis scenario (e.g., an analysis module instance of a high dynamic range (HDR) module may provide a confidence for an HDR scenario and recommended capture settings that can be used with the HDR scenario during capture) based upon analyzing the preview data stream. The set of modules may comprise a HDR analysis module, a multi-shot low-light capture analysis module, a flash bracketing analysis module, a focus bracketing analysis module, a haze removal analysis module, an auto-fix analysis module, a combination of multiple analysis modules, and/or any other module used for analyzing the preview data stream for recommending capture settings and/or providing analysis scenario confidence values. The HDR analysis module may provide capture settings for an HDR scenario that may fuse original images, captured at different exposures levels, to produce an image having a higher dynamic range (e.g., with a similar or increased bit depth) than the original images. The multi-shot low-light capture analysis module may provide capture settings for a multi-shot low-light capture scenario that may fuse original images (e.g., captured in low-light) to produce an image with a relatively lower noise-level than the original images. The flash bracketing analysis module may provide capture settings for a flash bracketing scenario that may use original images, captured with different flash settings (e.g., an off setting, a 50% setting, etc.), to produce an image having an improved detail level compared to the original images. The focus bracketing analysis module may provide capture settings for a focus bracketing scenario that may use original images, captured at different focus distances, to produce an image that may allow a user to perform various functionality, such as refocusing the image after capture, extracting an all-in-focus image, extracting a depth-map, viewing the image as a 3D image, etc. The haze removal analysis module may provide capture settings for a haze removal scenario that may use one or more original images to produce an image having a reduced haze. The auto-fix analysis module may provide capture settings for an auto-fix scenario that may use original images to produce an image that may be desirable for image enhancement, such as contrast enhancement, white balance correction, denoising, etc.

The camera capture recommendation may be generated based upon a selection of a potential camera capture recommendation, provided by a module, such as an analysis module, having a confidence above a confidence threshold. For example, a first potential camera capture recommendation, provided by a first analysis module, may be evaluated to determine a first confidence (e.g., a confidence that a first set of capture settings of the potential camera capture recommendation may result in a desired output image for the application). Responsive to the first confidence exceeding a confidence threshold, the first potential camera capture recommendation may be selected as the camera capture recommendation. In an example, a second potential camera capture recommendation, provided by a second analysis module, may be evaluated to determine a second confidence. Responsive to the second confidence exceeding the confidence threshold and the second confidence being greater than the first confidence, the second potential camera capture recommendation, but not the first potential camera capture recommendation, may be selected as the camera capture recommendation. The set of modules (e.g., analysis modules) may be extensible such that a new module may be added to the set of modules (e.g., a new module provided by the application, a software update, a firmware update, or an operating system update).

At 108, the camera capture recommendation may be provided to the application for selective application to the capture device. In an example, a capture recommendation module, hosted by an operating system, may provide the camera capture recommendation to the application. The operating system may expose the capture recommendation module and/or the camera capture recommendation to the application using an application programming interface (API). In an example, the camera capture recommendation may be provided in real-time during operation of a viewfinder interface displaying a visualization of the scene (e.g., the user may be previewing the outdoor scene of the car through the viewfinder interface that is displayed on a screen of the computing device). In an example, an updated preview data stream may be obtained from the capture device (e.g., the capture device may be capturing preview imagery of the outdoor scene in real-time for display through the viewfinder interface so that the user can preview the outdoor scene until the user initiates image capture functionality to obtain an output image). The updated preview data stream may be evaluated to generate an updated camera capture recommendation. The updated camera capture recommendation may be provided to the application for selective application to the capture device.

The application may be provided with discretion over whether and how to apply the camera capture recommendation to the capture device for obtaining the output image. The application may specify whether to use the entire set of capture settings, a portion of the set of capture settings, a modification to one or more capture settings, none of the set of capture settings, custom capture settings specified by the application, platform supplied image processing modules and image fusion modules, and/or custom image processing modules and image fusion modules provided by the application. For example, a recommendation implementation instruction may be received from the application. In an example, the recommendation implementation instruction may specify that the set of capture settings are to be applied to the capture device for obtaining a set of bracketed images that may be used to generate the output image for the application.

In another example, the recommendation implementation instruction may specify that a first capture setting of the set of capture settings is to be applied to the capture device for obtaining the set of bracketed images and that a second capture setting of the set of capture settings is not to be applied to the capture device for obtaining the set of bracketed images. In this way, the application may selectively utilize a portion of the camera capture recommendation.

In another example, the recommendation implementation instruction may specify that one or more capture settings of the set of capture settings are to be applied to the capture device for obtaining the set of bracketed images and that a custom capture setting (e.g., a modification to a recommended exposure level for HDR functionality) is to be applied to the capture device and/or a custom module (e.g., an image processing module, such as a blur reduction image processing module provided by the application, used to process the set of bracketed images) is to be applied to the set of bracketed images. In this way, the application may selectively utilize a portion of the camera capture recommendation and may specify custom capture settings and/or a custom module to use.

In another example, the recommendation implementation instruction may specify that the set of capture settings are not to be applied to the capture device for obtaining the set of bracketed images and that a custom capture setting is to be applied to the capture device and/or a custom module is to be applied to the set of bracketed images. In this way, the application may override the camera capture recommendation by specifying custom capture settings and/or a custom module to use.

In an example, the set of bracketed images may be captured by the captured device based upon the camera capture recommendation and/or the recommendation implementation instruction (e.g., utilizing recommended capture settings and/or custom capture settings). Image fusion may be performed on the set of bracketed images (e.g., utilizing one or more platform defined image processing modules and/or custom image processing modules) to create an output image (e.g., the set of bracketed images may comprise 3 images, having different exposure levels, which may be fused together to create the output image). The output image may be provided to the application. In an example, the application may provide an instruction to utilize a custom fusion module provided by the application. The custom fusion model may be applied to the set of bracketed images to create the output image. In an example, a fusion component, hosted by an operating system, may perform the image fusion. The operating system may expose the fusion capabilities of the fusion component to the application using an application programming interface (API). In this way, the application may control various aspects of image analysis and/or processing for generation of the output image. At 110, the method ends.

Figure 2:
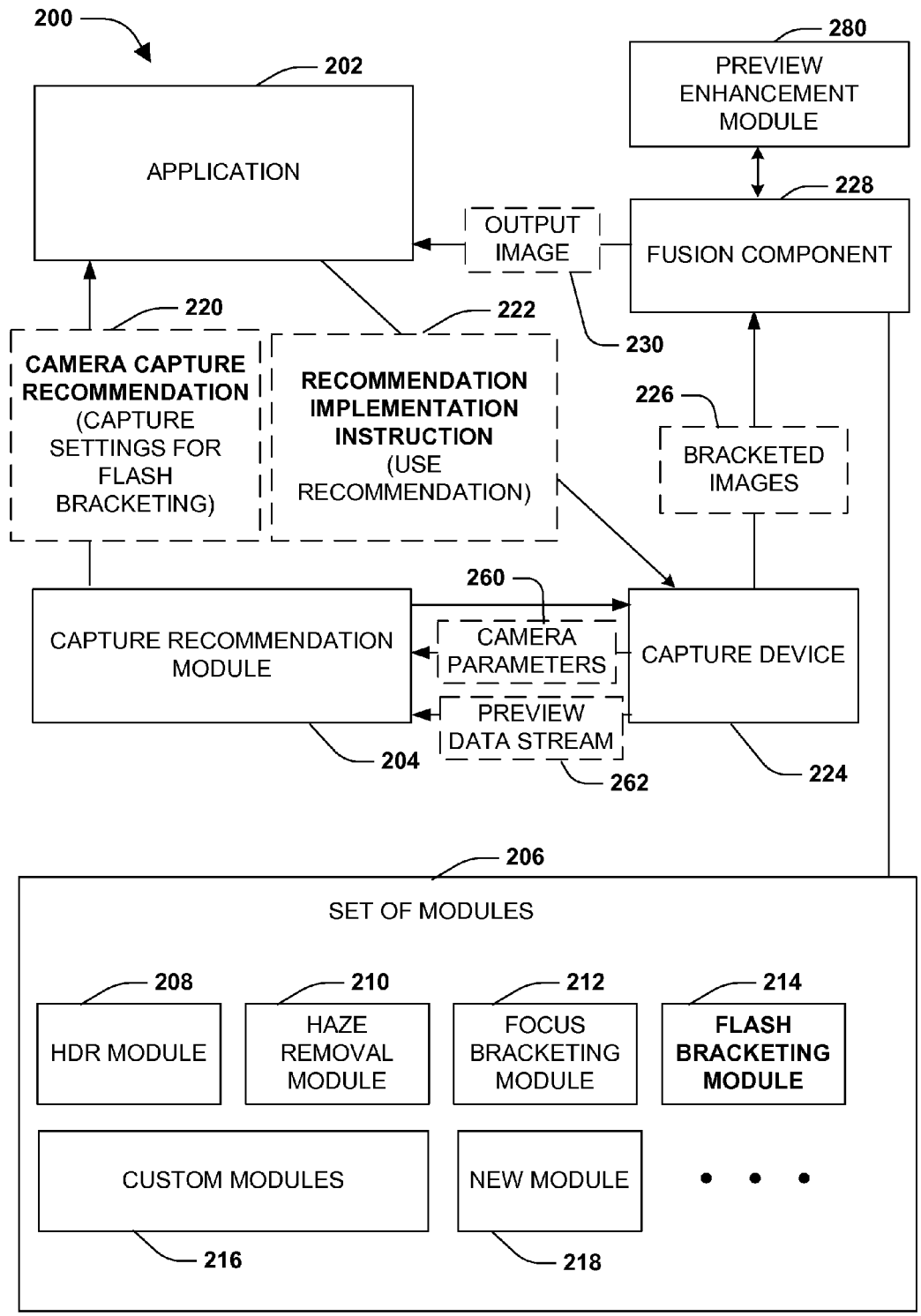
FIG. 2 is a component block diagram illustrating an exemplary system for camera capture recommendation, where a recommended module is used.

FIG. 2 illustrates an example of a system 200 for camera capture recommendation. The system 200 comprises a capture recommendation module 204 associated with a capture device 224. A computing device, such as a mobile phone, may comprise the capture device 224. The computing device may host an application 202 that may use images captured by the capture device 224. The capture recommendation module 204 may obtain camera parameters 260 of the capture device 224 (e.g., a zoom setting, a sensor frame rate, an exposure setting, etc.) that is to capture an image for the application 202 and/or a preview data stream 262 (e.g., pixel data depicting an indoor scene of a kitchen) from the capture device 224.

The capture recommendation module 204 may evaluate the camera parameters 260 and/or the preview data stream 262 to generate a camera capture recommendation 220. For example, the capture recommendation module 204 may utilize a set of modules 206 (e.g., analysis modules that analyze the preview data stream 262 to provide confidence for an analysis scenario and/or to provide recommended capture settings for the camera capture recommendation 220), such as an high dynamic range module 208, a haze removal module 210, a focus bracketing module 212, a flash bracketing module 214, one or more custom modules 216, a newly added new module 218, and/or other modules. For example, an analysis module instance of the flash bracketing module 214 may provide a potential camera capture recommendation having a confidence that exceeds a confidence threshold, and thus the potential camera capture recommendation may be selected as the camera capture recommendation 220 (e.g., a fusion component 228 may utilize an image processing module instance of the flash bracketing module 214 to use original images, captured with different flash settings (e.g., an off setting, a 35% setting, a 90% setting etc.), to produce an image having an improved detail level compared to the original images).

The capture recommendation module 204 may provide the camera capture recommendation 220 to the application 202. The capture device 224 may receive a recommendation implementation instruction 222 specifying that capture settings for flash bracketing, within the camera capture recommendation 220, are to be applied to the capture of a set of bracketed images 226. In an example, the fusion component 228 may fuse the set of bracketed images 226 together (e.g., utilizing the image processing module instance of the flash bracketing module 214) to create an output image 220 that may be provided to the application 202. In an example, a preview enhancement module 280 may be configured to receive the recommendation implementation instruction 222 from the application 202. The preview enhancement module 280 may iteratively apply the recommendation implementation instruction 222 for image processing of bracketed images 226 captured by the capture device 224. The preview enhancement module may perform real-time fusion of the bracketed images 226.

Figure 3:
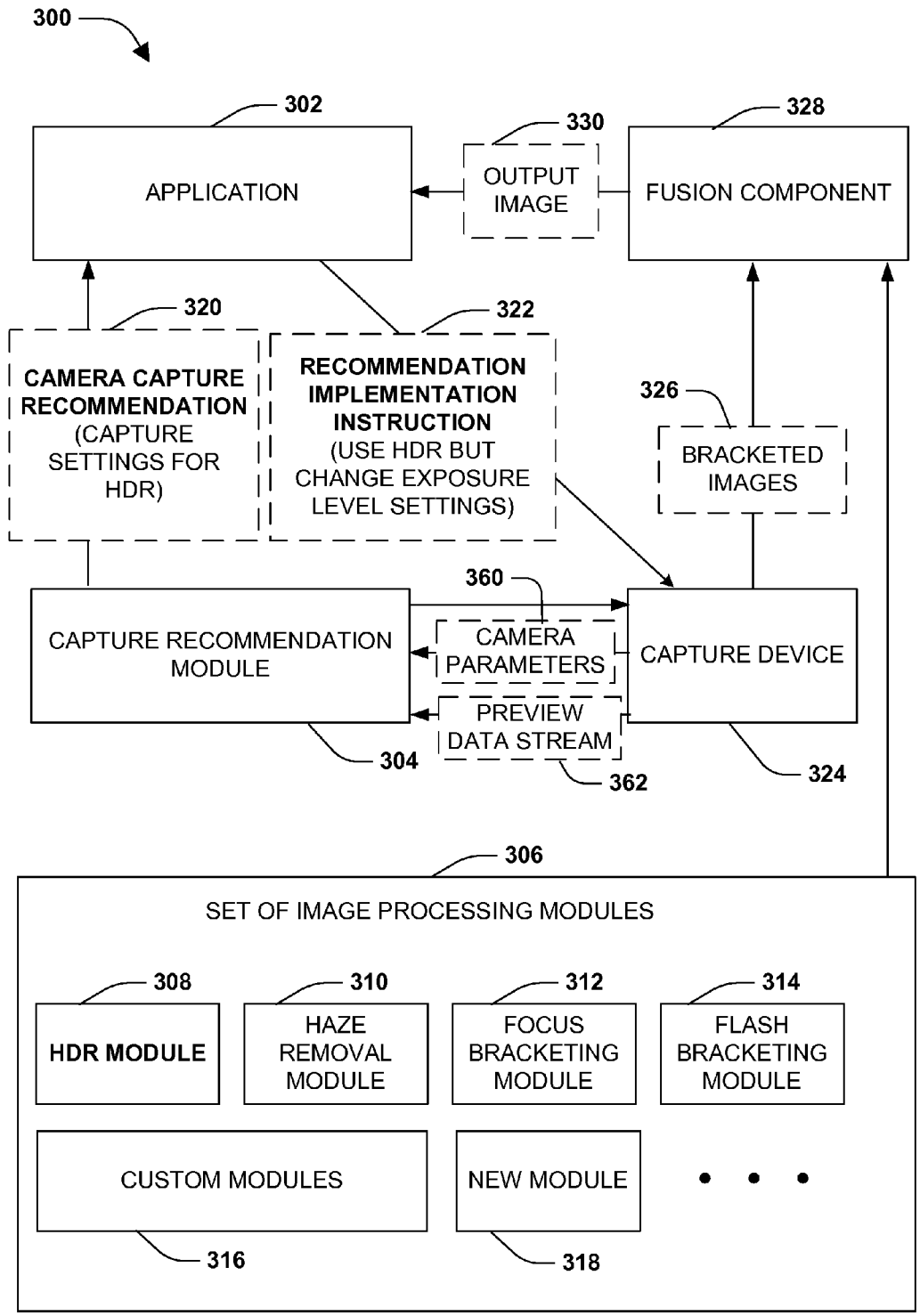
FIG. 3 is a component block diagram illustrating an exemplary system for camera capture recommendation, where a modification to a recommended module is used.

FIG. 3 illustrates an example of a system 300 for camera capture recommendation. The system 300 comprises a capture recommendation module 304 associated with a capture device 324. A computing device, such as a tablet, may comprise the capture device 324. The computing device may host an application 302 that may use images captured by the capture device 324. The capture recommendation module 304 may obtain camera parameters 360 of the capture device 324 (e.g., a focus setting, a flash setting, an estimate noise variance, etc.) that is to capture an image for the application 302 and/or a preview data stream 362 (e.g., pixel data depicting an outdoor scene of a park) from the capture device 324.

The capture recommendation module 304 may evaluate the camera parameters 360 and/or the preview data stream 362 to generate a camera capture recommendation 320. For example, the capture recommendation module 304 may utilize a set of modules 306 (e.g., analysis modules that analyze the preview data stream 362 to provide confidence for an analysis scenario and/or to provide recommended capture settings for the camera capture recommendation 320), such as an high dynamic range (HDR) module 308, a haze removal module 310, a focus bracketing module 312, a flash bracketing module 314, one or more custom models 316, a newly added new module 318, and/or other modules. For example, an analysis module instance of the HDR module 308 may provide a potential camera capture recommendation having a confidence that exceeds a confidence threshold, and thus the potential camera capture recommendation may be selected as the camera capture recommendation 320 (e.g., a fusion component 328 may utilize an image processing module instance of the HDR module 308 to fuse original images, captured at different exposures levels, to produce an image having a higher dynamic range (e.g., with a similar or increased bit depth) than the original images).

The capture recommendation module 304 may provide the camera capture recommendation 320 to the application 302. The capture device 324 may receive a recommendation implementation instruction 322 specifying that the image processing module instance of the HDR module 308 is to be used and that recommended HDR exposure level capture settings from the camera capture recommendation 320 are to be modified (e.g., an exposure level may be changed from a suggested value to an application specified value). The recommendation implementation instruction 322 may be applied. In an example, the fusion component 328 may fuse the set of bracketed images 326 together (e.g., utilizing the image processing module instance of the HDR module 308) to create an output image 330 that may be provided to the application 302.

Figure 4:
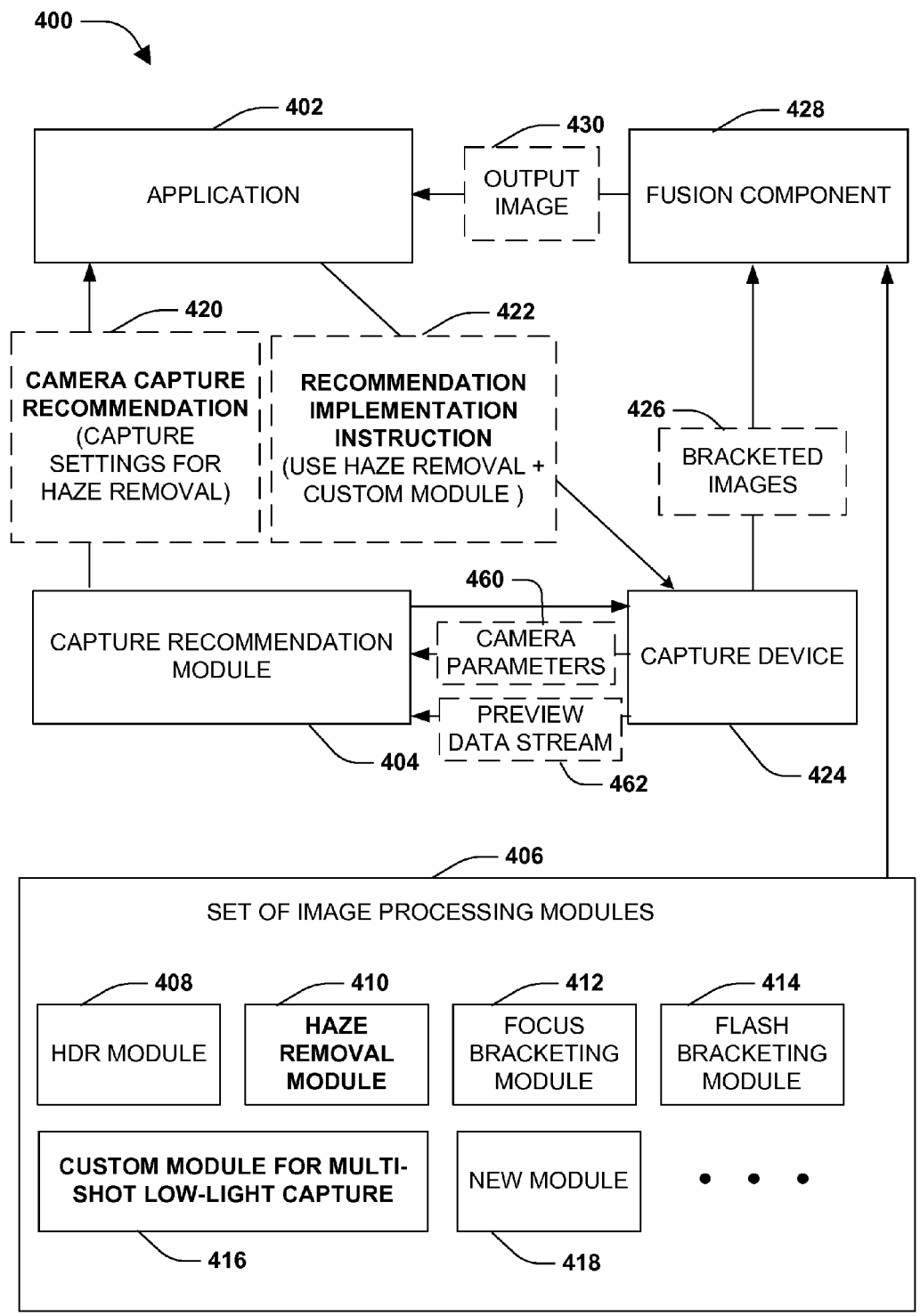
FIG. 4 is a component block diagram illustrating an exemplary system for camera capture recommendation, where a recommended module and a custom module are used.

FIG. 4 illustrates an example of a system 400 for camera capture recommendation. The system 400 comprises a capture recommendation module 404 associated with a capture device 424. A computing device, such as a wearable device (e.g., a smart watch), may comprise the capture device 424. The computing device may host an application 402 that may use images captured by the capture device 424. The capture recommendation module 404 may obtain camera parameters 460 of the capture device 424 (e.g., an estimated depth of a scene, a sharpness map of a scene, etc.) that is to capture an image for the application 402 and/or a preview data stream 462 (e.g., pixel data depicting an indoor scene of a living room) from the capture device 424.

The capture recommendation module 404 may evaluate the camera parameters 460 and/or the preview data stream 462 to generate a camera capture recommendation 420. For example, the capture recommendation module 404 may utilize a set of modules 406 (e.g., analysis modules that analyze the preview data stream 462 to provide confidence for an analysis scenario and/or to provide recommended capture settings for the camera capture recommendation 420), such as an high dynamic range module 408, a haze removal module 410, a focus bracketing module 412, a flash bracketing module 414, one or more custom models 416, a newly added new module 418, and/or other modules. For example, an analysis module instance of the haze removal module 410 may provide a potential camera capture recommendation having a confidence that exceeds a confidence threshold, and thus the potential camera capture recommendation may be selected as the camera capture recommendation 420 (e.g., a fusion component 428 may utilize an image processing module instance of the haze removal module 410 to use one or more original images to produce an image having a reduced haze).

The capture recommendation module 404 may provide the camera capture recommendation 420 to the application 402. The capture device 424 may receive a recommendation implementation instruction 422 specifying that the image processing module instance of the haze removal module 410 and/or a custom module 416 (e.g., an image processing module instance of a multi-shot low-light capture module provided by the application 402) are to be applied to a set of bracketed images 426. In an example, the fusion component 428 may fuse the set of bracketed images 426 together (e.g., utilizing the image processing module instance of the haze removal module 410 and/or the custom module 416) to create an output image 430 that may be provided to the application 402.

Figure 5:
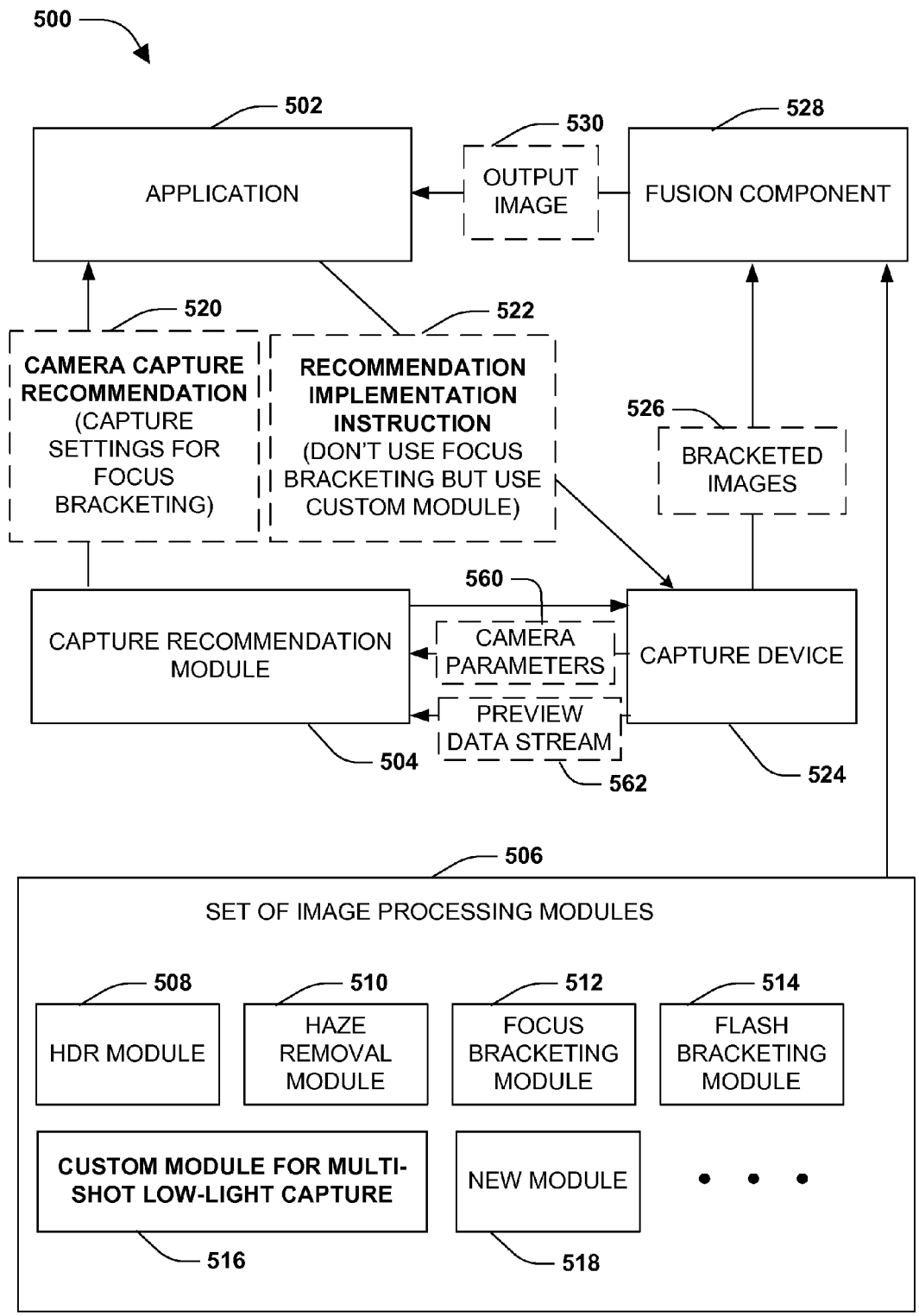
FIG. 5 is a component block diagram illustrating an exemplary system for camera capture recommendation, where a recommended module is not used and a custom module is used.

FIG. 5 illustrates an example of a system 500 for camera capture recommendation. The system 500 comprises a capture recommendation module 504 associated with a capture device 524. A computing device, such as a wearable device (e.g., smart glasses), may comprise the capture device 524. The computing device may host an application 502 that may use images captured by the capture device 524. The capture recommendation module 504 may obtain camera parameters 560 of the capture device 524 (e.g., feature points of a scene, a white balance parameter, an ISO setting, etc.) that is to capture an image for the application 502 and/or a preview data stream 562 (e.g., pixel data depicting an outdoor scene of a downtown) from the capture device 524.

The capture recommendation module 504 may evaluate the camera parameters 560 and/or the preview data stream 562 to generate a camera capture recommendation 520. For example, the capture recommendation module 504 may utilize a set of modules 506 (e.g., analysis modules that analyze the preview data stream 562 to provide confidence for an analysis scenario and/or to provide recommended capture settings for the camera capture recommendation 520), such as an high dynamic range module 508, a haze removal module 510, a focus bracketing module 512, a flash bracketing module 514, one or more custom models 516, a newly added new module 518, and/or other modules. For example, an analysis module instance of the focus bracketing module 512 may provide a potential camera capture recommendation having a confidence that exceeds a confidence threshold, and thus the potential camera capture recommendation may be selected as the camera capture recommendation 520 (e.g., a fusion component 528 may utilize an image processing module instance of the focus bracketing module 512 to use original images, captured at different focus distances, to produce an image that may allow a user to perform various functionality, such as refocusing the image after capture, extracting an all-in-focus image, extracting a depth-map, viewing the image as a 3D image, etc.).

The capture recommendation module 504 may provide the camera capture recommendation 520 to the application 502. The capture device 524 may receive a recommendation implementation instruction 522 specifying that the image processing module instance of the focus bracketing module 512 is not be to be used, and that a custom module 516 (e.g., an image processing module instance of a multi-shot low-light capture module provided by the application 502) is to be applied to a set of bracketed images 526. In an example, the fusion component 528 may fuse the set of bracketed images 526 together (e.g., utilizing the custom module 516) to create an output image 530 that may be provided to the application 502.

Figure 6:
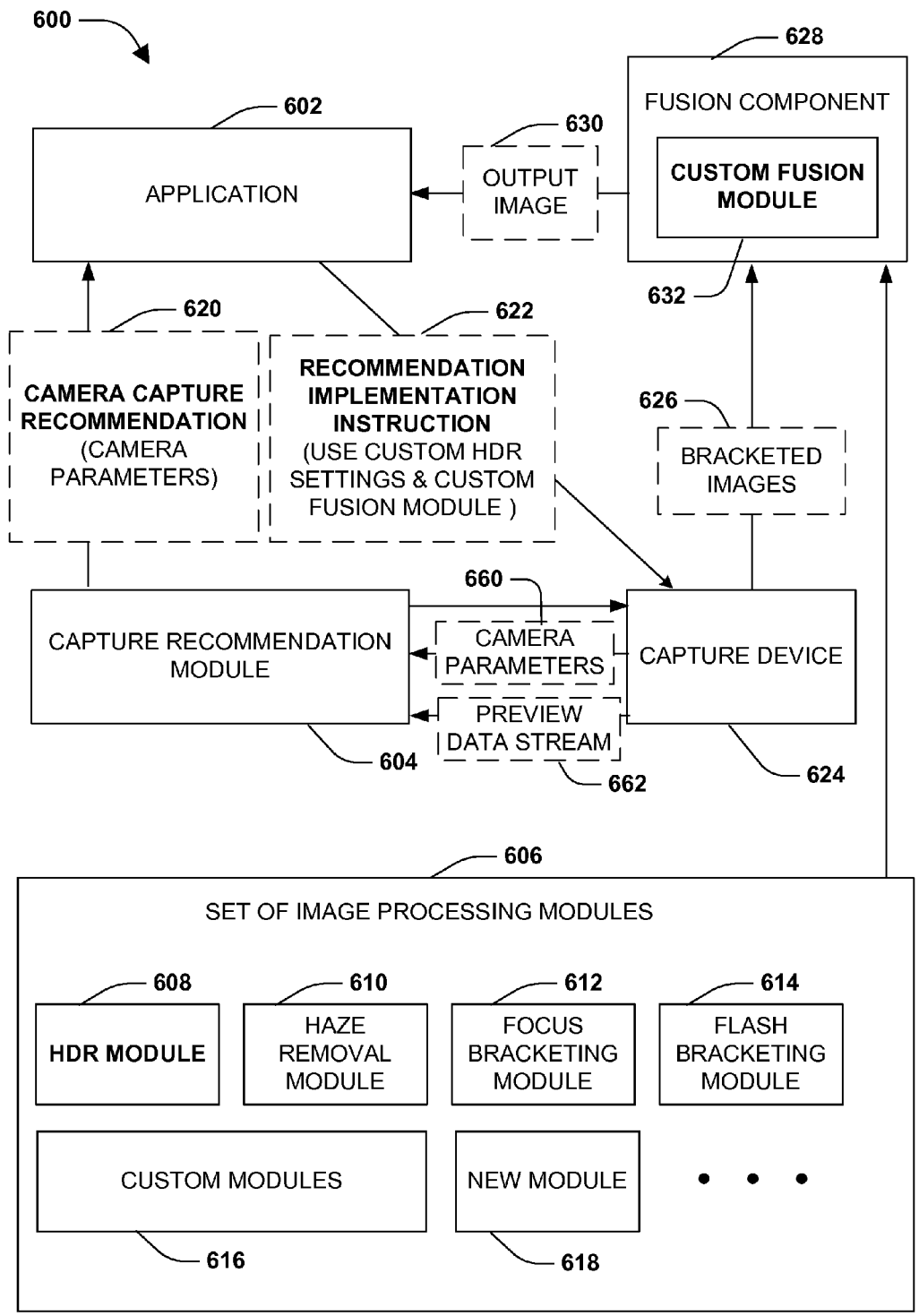
FIG. 6 is a component block diagram illustrating an exemplary system for camera capture recommendation, where a recommended module and a custom fusion module are used.

FIG. 6 illustrates an example of a system 600 for camera capture recommendation. The system 600 comprises a capture recommendation module 604 associated with a capture device 624. A computing device, such as a tablet, may comprise the capture device 624. The capture recommendation module 604 may determine that the application 602 is to capture an image using the capture device 624. The capture recommendation module 604 may obtain camera parameters 660 of the capture device 624, such as an exposure time, an exposure compensation, ISO settings, focus settings, a capture scene mode (e.g., auto, manual, portrait, macro, etc.), a flash setting (e.g., power), a zoom setting, a sensor frame rate, a white balance parameter, a histogram of a scene that is to be captured by the capture device, an estimated noise variance, an estimated depth of the scene, a sharpness map of the scene, feature points in the scene (e.g., SIFT), or any other camera parameters or combinations thereof.

The capture recommendation module 604 may evaluate the camera parameters 660 and/or the preview data stream 662 to generate a camera capture recommendation 620. For example, the capture recommendation module 604 may comprise the camera parameters 660 or a subset thereof. For example, the capture recommendation module 604 may provide the camera capture recommendation 620, comprising a subset of the camera parameters 660, to the application 602 so that the application 602 may specify custom capture settings, custom image processing modules, and/or custom fusion models to use. The device 624 may receive a recommendation implementation instruction 622 specifying that custom high dynamic range (HDR) capture settings are to be applied to the capture device 624 for obtaining the bracketed images 626. The recommendation implementation instruction 622 may specify that a custom fusion model 632 (e.g., provided by the application 602) is to be used by the fusion component 628 to fuse the set of bracketed images 626 together to create an output image 630 that may be provided to the application 602.

According to an aspect of the instant disclosure, a system for camera capture recommendation is provided. The system includes a capture recommendation module. The capture recommendation module is configured to obtain at least one of camera parameters of a capture device that is to capture an image for use by an application or a preview data stream from the capture device. The preview data stream depicts a scene for capture by the capture device. The capture recommendation module is configured to evaluate at least one of the camera parameters or the preview data stream to generate a camera capture recommendation. The capture recommendation module is configured to provide the camera capture recommendation to the application.

According to an aspect of the instant disclosure, a method for camera capture recommendation is provided. The method includes obtaining at least one of camera parameters of a capture device that is to capture an image for use by an application or a preview data stream from the capture device. The preview data stream depicts a scene for capture by the capture device. The method includes evaluating at least one of the camera parameters or the preview data stream to generate a camera capture recommendation. The method includes providing the camera capture recommendation to the application.

According to an aspect of the instant disclosure, a system for image fusion is provided. The system includes a fusion component. The fusion component is configured to obtain a set of bracketed images captured by a capture device based upon a recommendation implementation instruction specified by an application in response to a camera capture recommendation provided to the application. The fusion component is configured to perform image fusion on the set of bracketed images based upon the recommendation implementation instruction to create an output image. The function component is configured to provide the output image to the application.

According to an aspect of the instant disclosure, a means for camera capture recommendation is provided. At least one of camera parameters of a capture device that is to capture an image for use by an application or a preview data stream is obtained from the capture device, by the means for camera capture recommendation. The preview data stream depicts a scene for capture by the capture device. At least one of the camera parameters or the preview data stream are evaluated to generate a camera capture recommendation, by the means for camera capture recommendation. The camera capture recommendation is provided to the application, by the means for camera capture recommendation.

According to an aspect of the instant disclosure, a means for image fusion is provided. A set of bracketed images, captured by a capture device based upon a recommendation implementation instruction specified by an application in response to a camera capture recommendation provided to the application, is obtained, by the means for image fusion. Image fusion is performed on the set of bracketed images based upon the recommendation implementation instruction to create an output image, by the means for image fusion. The output image is provided to the application, by the means for image fusion.

Figure 7:
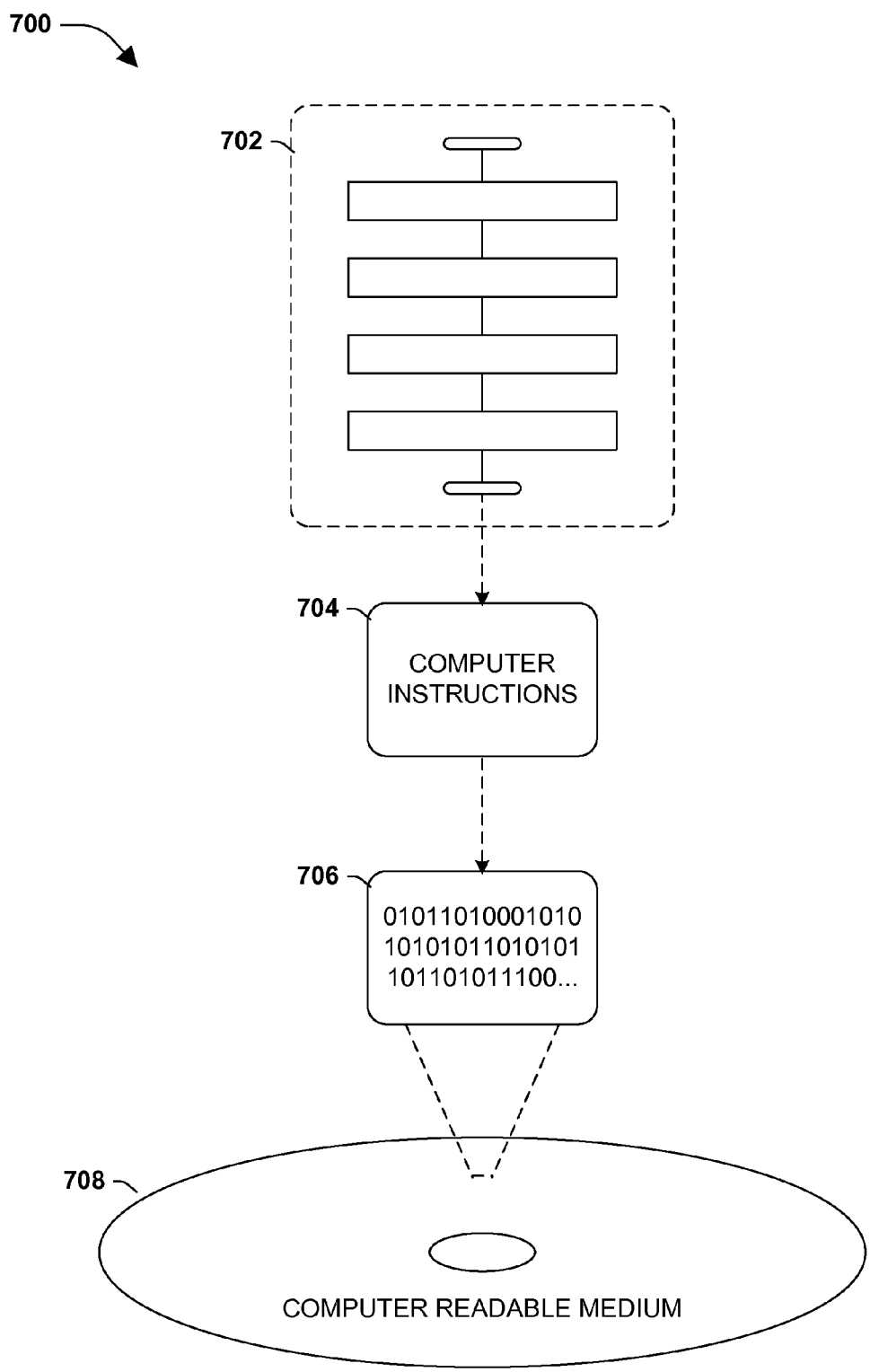
FIG. 7 is an illustration of an exemplary computer readable medium wherein processor-executable instructions configured to embody one or more of the provisions set forth herein may be comprised.

Still another embodiment involves a computer-readable medium comprising processor-executable instructions configured to implement one or more of the techniques presented herein. An example embodiment of a computer-readable medium or a computer-readable device is illustrated in FIG. 7, wherein the implementation 700 comprises a computer-readable medium 708, such as a CD-R, DVD-R, flash drive, a platter of a hard disk drive, etc., on which is encoded computer-readable data 706. This computer-readable data 706, such as binary data comprising at least one of a zero or a one, in turn comprises a set of computer instructions 704 configured to operate according to one or more of the principles set forth herein. In some embodiments, the processor-executable computer instructions 704 are configured to perform a method 702, such as at least some of the exemplary method 100 of FIG. 1, for example. In some embodiments, the processor-executable instructions 704 are configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, and/or at least some of the exemplary system 600 of FIG. 6, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
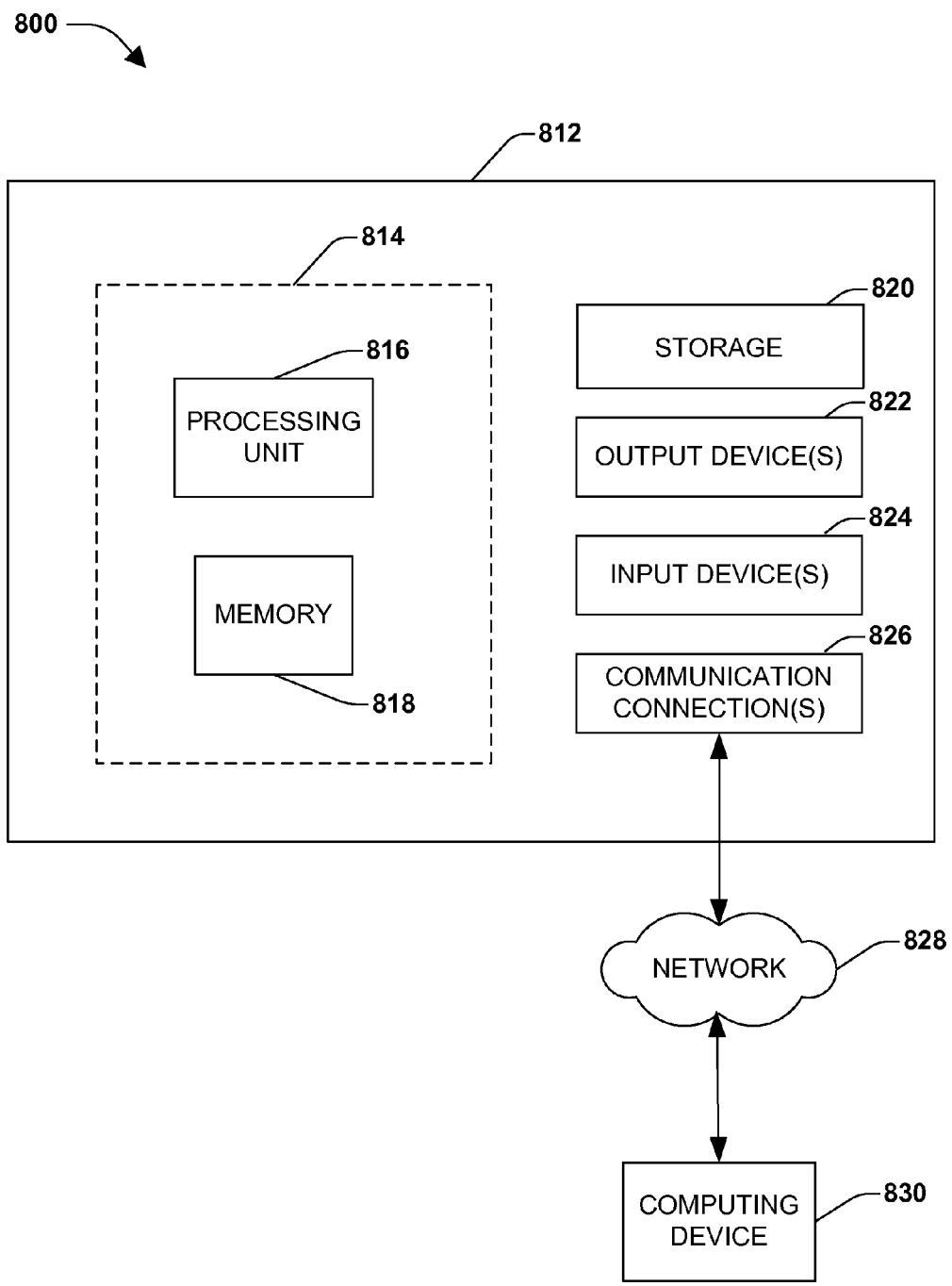
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 800 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Computer storage media does not, however, include propagated signals. Rather, computer storage media excludes propagated signals. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment, an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via a network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system for camera capture recommendation, comprising:
   an application configured to utilize an image captured by a capture device, the application further configured to create an instance of a capture recommendation module; and
   the capture recommendation module configured to:
     obtain at least one of camera parameters of the capture device that is to capture the image for use by the application or a preview data stream from the capture device, the preview data stream depicting a scene for capture by the capture device;
     evaluate at least one of the camera parameters or the preview data stream to generate a plurality of potential camera capture recommendations;
     selecting one of the plurality of potential camera capture recommendations as a camera capture recommendation based on a determined confidence associated with each of the plurality of potential camera capture recommendations; and
     provide the selected camera capture recommendation to the application.

2. The system of claim 1, comprising:
   a fusion component configured to:
     obtain a set of bracketed images captured by the capture device based upon the camera capture recommendation;
     perform image fusion on the set of bracketed images to create an output image; and
     provide the output image to the application.

3. The system of claim 1, comprising:
   a fusion component configured to:
     receive an instruction from the application to utilize a custom fusion module for fusing bracketed images;
     obtain a set of bracketed images captured by the capture device based upon the camera capture recommendation;
     apply the custom fusion module to the set of bracketed images to create an output image; and
     provide the output image to the application.

4. The system of claim 1, the camera capture recommendation comprising at least one of a set of capture settings or a number of images to capture for image fusion.

5. The system of claim 4, the capture device configured to:
   receive a recommendation implementation instruction from the application, the recommendation implementation instruction specifying that the set of capture settings are to be applied to the capture device for obtaining a set of bracketed images.

6. The system of claim 4, the capture device configured to:
   receive a recommendation implementation instruction from the application, the recommendation implementation instruction specifying that a first capture setting of the set of capture settings is to be applied to the capture device for obtaining a set of bracketed images and that a second capture setting of the set of capture settings is not to be applied to the capture device for obtaining the set of bracketed images.

7. The system of claim 4, the capture device configured to:
   receive a recommendation implementation instruction from the application, the recommendation implementation instruction specifying that one or more capture settings of the set of capture settings are to be applied to the capture device for obtaining a set of bracketed images and that at least one of a custom capture setting or a custom module are to be applied.

8. The system of claim 4, the capture device configured to:
   receive a recommendation implementation instruction from the application, the recommendation implementation instruction specifying that the set of capture settings are not to be applied to the capture device for obtaining a set of bracketed images and that at least one of a custom capture setting or a custom module are to be applied.

9. The system of claim 1, the capture recommendation module configured to:
   evaluate the preview data stream using a set of modules to generate the camera capture recommendation.

10. The system of claim 1, comprising:
    a preview enhancement module configured to:
      receive a recommendation implementation instruction from the application;
      iteratively apply the recommendation implementation instruction for image processing of bracketed images captured by the capture device; and
      perform real-time fusion of the bracketed images.

11. The system of claim 9, the capture recommendation module configured to:
    receive a specification of a new module; and
    include the new module within the set of modules used to evaluate the camera parameters and the preview data stream.

12. The system of claim 1, the capture recommendation module hosted by an operating system that exposes the capture recommendation module to the application using an application programming interface (API).

13. The system of claim 9, the capture recommendation module configured to:
    evaluate a first potential camera capture recommendation provided by a first module, of the set of modules, to determine a first confidence; and
    responsive to the first confidence exceeding a confidence threshold, select the first potential camera capture recommendation as the camera capture recommendation.

14. The system of claim 13, the capture recommendation module configured to:
    evaluate a second potential camera capture recommendation provided by a second module, of the set of modules, to determine a second confidence; and
    responsive to the second confidence exceeding the confidence threshold and the second confidence being greater than the first confidence, select the second potential camera capture recommendation, but not the first potential camera capture recommendation, as the camera capture recommendation.

15. The system of claim 1, the capture recommendation module configured to:
    obtain an updated preview data stream from the capture device;

evaluate the updated preview data stream to generate an updated camera capture recommendation; and
provide the updated camera capture recommendation to the application.

16. The system of claim 1, the capture recommendation module configured to:
provide the camera capture recommendation in real-time during operation of a viewfinder interface displaying the scene.

17. The system of claim 2, the fusion component hosted by an operating system that exposes the fusion component to the application using an application programming interface (API).

18. A method for camera capture recommendation, comprising:
creating an instance of a camera recommendation module by an application;
by the camera recommendation module, obtaining at least one of camera parameters of a capture device that is to capture an image for use by the application or a preview data stream from the capture device, the preview data stream depicting a scene for capture by the capture device;
by the camera recommendation module, evaluating at least one of the camera parameters or the preview data stream to generate a plurality of potential camera capture recommendation;
by the camera recommendation module, selecting one of the plurality of potential camera capture recommendations as a camera capture recommendation based on a determined confidence associated with each of the plurality of potential camera capture recommendations; and
by the camera recommendation module, providing the selected camera capture recommendation to the application.

19. A system for image fusion, comprising:
an application configured to utilize an image captured by a capture device, the application further configured to create an instance of a capture recommendation module;
a capture recommendation module configured to evaluate at least one of camera parameters or a preview data stream to generate a plurality of potential camera capture recommendations, select one of the plurality of potential camera capture recommendations as a camera capture recommendation based on a determined confidence associated with each of the plurality of potential camera capture recommendations, and, provide the selected camera capture recommendation to the application; and
a fusion component configured to:
obtain a set of bracketed images captured by the capture device based upon a recommendation implementation instruction specified by the application in response to the camera capture recommendation provided to the application by the capture recommendation module;
perform image fusion on the set of bracketed images based upon the recommendation implementation instruction to create an output image; and
provide the output image to the application.

20. The system of claim 19, the recommendation implementation instruction comprising an instruction to utilize a custom fusion module for fusing bracketed images, and the fusion component configured to:
apply the custom fusion module to the set of bracketed images to create the output image.

* * * * *